Feb. 23, 1965

J. W. MOMBERG ETAL 3,171,074

SPEED-REGULATING CONTROL SYSTEMS FOR
SERIES COMMUTATOR MOTORS

Filed March 6, 1961

INVENTORS
James W. Momberg
Edward W. Taylor

WITNESS
William Martin

BY
Marshall J. Breen
ATTORNEY

United States Patent Office 3,171,074
Patented Feb. 23, 1965

3,171,074
SPEED-REGULATING CONTROL SYSTEMS FOR SERIES COMMUTATOR MOTORS
James W. Momberg, Somerville, and Edward W. Taylor, Martinsville, N.J., assignors to The Singer Manufacturing Company, Elizabeth, N.J., a corporation of New Jersey
Filed Mar. 6, 1961, Ser. No. 93,493
4 Claims. (Cl. 318—246)

This invention relates to speed-regulating systems for series commutator motors fed from an alternating current supply voltage and more particularly to such systems wherein a solid-state controlled rectifier is used as the motor current-controlling element and wherein means are provided for compensating for the adverse effect on the speed of variations in the supply voltage.

In systems which depend on an error signal derived by comparing the armature feedback voltage with an adjustable reference voltage it is desirable that the reference voltage, when once set, should remain constant and substantially independent of variations in the supply voltage.

A system of this type is shown and described in the United States Patent No. 2,939,064, now Reissue Patent No. 25,203, to which reference may be had for a clear understanding of its operation. It will be seen that the reference voltage for this prior art system is derived directly from the supply voltage by a voltage divider. Thus the reference voltage fluctuates with the supply voltage and introduces a speed fluctuation which is undesirable.

It is to the solution of this problem that the present invention is directed.

It is an object of this invention, therefore, to provide speed-regulating means for a series commutator motor which shall hold the speed constant and substantially independent of normal variations in the supply voltage.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 1:
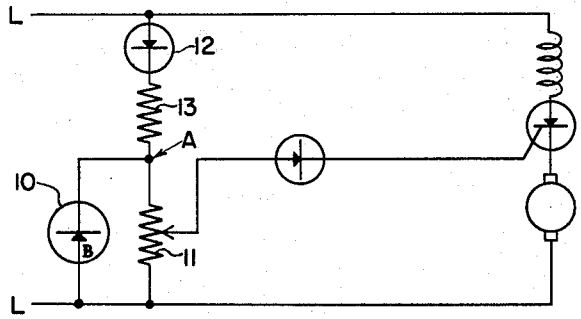
FIG. 1 is a circuit diagram of a modification of a prior art circuit to stabilize the reference voltage against fluctuations in the supply voltage.

Referring to FIG. 1 it will be seen that this circuit is the same as that of the United States Patent No. 2,939,064, referred to above, except that it is modified to include a Zener diode 10 shunting the adjustable resistor 11 and an ordinary diode 12 in series with the voltage divider circuit 11, 13 and the source L—L of A.C. voltage. The diode 12 is used to prevent forward conduction of the Zener diode on alternate half waves of the A.C. source voltage. It is well known that the Zener diode will break down at some critical reverse voltage and will maintain this voltage constant over a considerable current range, the remainder of the applied voltage being absorbed by the series resistor, in this case resistor 13. Since there is no current flow during alternate half cycles due to blocking by the diode 12 the resistor 13 dissipates less heat and therefore may be made physically smaller than in the circuit of the prior art, at the expense of course of the added diode 12. Thus the reference voltage at point A will be maintained substantially constant during alternate half waves over an input voltage variation at terminals L—L of ±10%.

Figure 2:
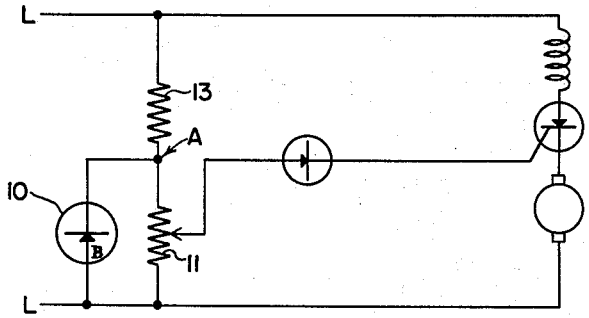
FIG. 2 is a modification of the circuit of FIG. 1.

It has been found that the diode 12 is not necessary to the functioning of the circuit and, if the increased watts dissipation in resistor 13 can be tolerated, the diode 12 may be omitted and the simpler circuit of FIG. 2 results. Here again the voltage at point A is held constant during alternate half waves at the Zener breakdown value and any proportionate lower but also stable value is obtained by moving the slider of the adjustable resistor 11 to the value desired.

Figure 3:
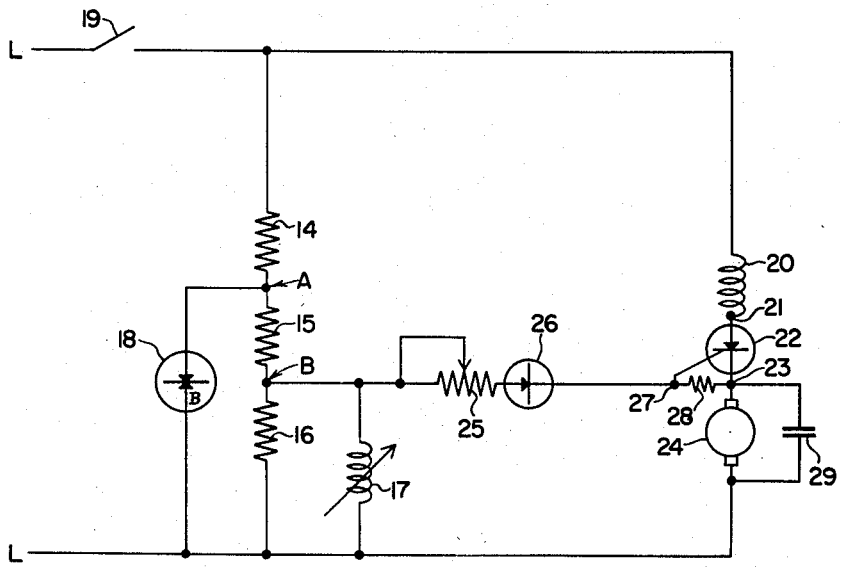
FIG. 3 is a circuit diagram illustrating an embodiment of the invention.

When a variable reluctance device is used to set the reference voltage as shown and described in the United States patent application Serial No. 67,063, filed November 3, 1960, now United States Patent No. 3,058,044, it is found that a double anode Zener diode must be used as the voltage regulating element to get sufficient inductive reactance change to cover the desired speed range. A circuit incorporating such a Zener diode for regulating the A.C. reference voltage is shown in FIG. 3.

In this circuit the voltage divider comprises resistors 14, 15, 16 in series across the line L—L with the coil 17 of the variable reluctance element shunting the resistor 16. A double-anode Zener diode 18 is shunted across the series connected resistors to hold the voltage at point A at the Zener breakdown value on both positive and negative half waves. Two single anode Zener diodes in back-to-back relation may be substituted for the double-anode Zener diode 18. The voltage at A is an A.C. voltage with both peaks clipped to the Zener level and remains substantially the same throughout variations in the voltage of the source L—L of ±10%. The A.C. reference voltage at point B can then be adjusted by varying the reluctance of the flux path through the coil 17 and when once set it remains substantially constant regardless of normal fluctuations in the source voltage.

The series motor current circuit may be traced from one side of the supply L—L through switch 19, field winding 20 to the anode terminal 21 of a silicon controlled rectifier 22, through the rectifier to the cathode terminal 23, thence through the armature winding 24 to the other side of the supply L—L.

The gate circuit may be traced from the cathode terminal 23 through the armature winding 24, through the coil 17, through the calibrating resistor 25 and diode 26 to the gate terminal 27. It is in this latter circuit that the feedback armature voltage is combined with the reference voltage across the coil 17 to produce the gate-to-cathode voltage for firing the rectifier 22. The resistor 25 is used as a final factory setting to compensate for differences in the motor characteristics and in the firing characteristics of the rectifier due to normal manufacturing tolerances.

The operation of the circuit of FIG. 3 is essentially the same as described in the United States patent application Serial No. 67,063, now United States Patent No. 3,058,044, referred to above except that the voltage across the coil 17 for any one position of the reluctance-varying element remains substantially fixed regardless of normal line variations in the voltage of source L—L. This is normally sufficient to hold the speed of the motor substantially constant inasmuch as the residual field flux does not change much with line voltage changes because the field is usually worked well up on its saturation curve.

A resistor 28 may be connected between the cathode terminal 23 and the gate terminal 27 to lower the gate impedance and render it less sensitive to noise voltages. A capacitor 29 may be connected in shunt with the armature to attenuate noise voltages due to commutator sparking. It is understood that resistor 28 and capacitor 29 are not necessary to the functioning of the circuit but represent obvious circuit refinements to prevent or reduce misfiring of the controlled rectifier due to adverse noise voltages.

The following practical component values have been used in these circuits for controlling a conventional series commutator motor for driving a family sewing machine.

*Circuit of FIG. 1*

| | |
|---|---|
| Zener diode 10 | Motorola 1M27Z. |
| Resistor 11 | 10,000 ohm, 2 watt pot. |
| Resistor 13 | 4,000 ohm, ½ watt. |
| Diode 12 | Sarks-Tarzian F6. |
| Diode in gate circuit | 1N91. |
| Rectifier | General Electric C11B. |

*Circuit of FIG. 2*

| | |
|---|---|
| Zener diode 10 | Motorola 1M27Z. |
| Resistor 11 | 5000 ohm, 2 watt pot. |
| Resistor 13 | 3300 ohms, 2 watts. |
| Diode in gate circuit | 1N91. |
| Rectifier | General Electric C11B. |

*Circuit of FIG. 3*

| | |
|---|---|
| Zener diode 18 | Motorola 10M39Z (two back-to-back). |
| Resistor 14 | 2000 ohms, 2 watts. |
| Resistor 15 | 3300 ohms, 2 watts. |
| Resistor 16 | 2400 ohms, ½ watt. |
| Coil 17 | Reactance variable from 330 ohms to 1000 ohms at 60 c.p.s. |
| Resistor 25 | 1000 ohm, 2 watt pot. |
| Diode 26 | 1N91. |
| Rectifier 22 | General Electric C11B. |
| Line voltage for all circuits | 115 volts 60 c.p.s. |

Having thus set forth the nature of the invention, what we claim herein is:

1. A speed-regulating control system for an electric motor having series-connected field and armature windings fed from an A.C. supply voltage comprising a solid-state controlled rectifier having an anode, a cathode and a gate for controlling the current to said windings, means for deriving a reference voltage for the gate including a fixed impedance connected across the supply voltage, a double-anode Zener diode shunting a portion of said impedance to stabilize the voltage across said portion, and a variable inducting impedance shunting a part of the portion shunted by the Zener diode, said variable impedance being connected in series with the armature winding between the gate and cathode of said rectifier.

2. A speed-regulating control system for an electric motor having series connected field and armature windings fed from an A.C. supply voltage comprising a solid-state controlled rectifier having an anode, a cathode and a gate for controlling the current to said windings, means for deriving an adjustable A.C. reference voltage for the gate including series-connected fixed impedances across the supply voltage, a double-anode Zener diode connected in shunt with a portion of said fixed impedances to establish a stable voltage across said portion, and an adjustable inductive impedance shunting part of the portion shunted by the Zener diode, said adjustable impedance being connected in series-circuit relation with the armature winding and the gate and cathode of the rectifier.

3. A system in accordance with claim 2 in which the adjustable impedance is an inductance coil with means for adjusting the reluctance of the flux path through the coil.

4. In an electrical control system, the combination of an electric motor adapted to be connected to an alternating current source and having series-connected armature and field windings, a solid state controlled rectifier having an anode-cathode circuit connected in series with the armature and field windings and having a gate-cathode control circuit, means including a double-anode Zener diode for deriving from said source a constant A.C. signal, adjustable inductive impedance means for selecting a portion of said constant A.C. signal, and means coupling said selected A.C. signal and said motor armature winding to said gate-cathode control circuit.

References Cited in the file of this patent

UNITED STATES PATENTS

| | | |
|---|---|---|
| 2,939,064 | Momberg et al. | May 31, 1960 |
| 2,991,407 | Murphy | July 4, 1961 |
| 3,005,147 | Thomas | Oct. 17, 1961 |

OTHER REFERENCES

Publication: Applications and Circuit Design Notes Bulletin D420-02-8-59, Solid State Products, Salem, Massachusetts, August 1959, pages 16 and 26.